F. C. MILLER.
TIRE HOLDER.
APPLICATION FILED JULY 25, 1913.
1,136,547.
Patented Apr. 20, 1915.
2 SHEETS—SHEET 1.
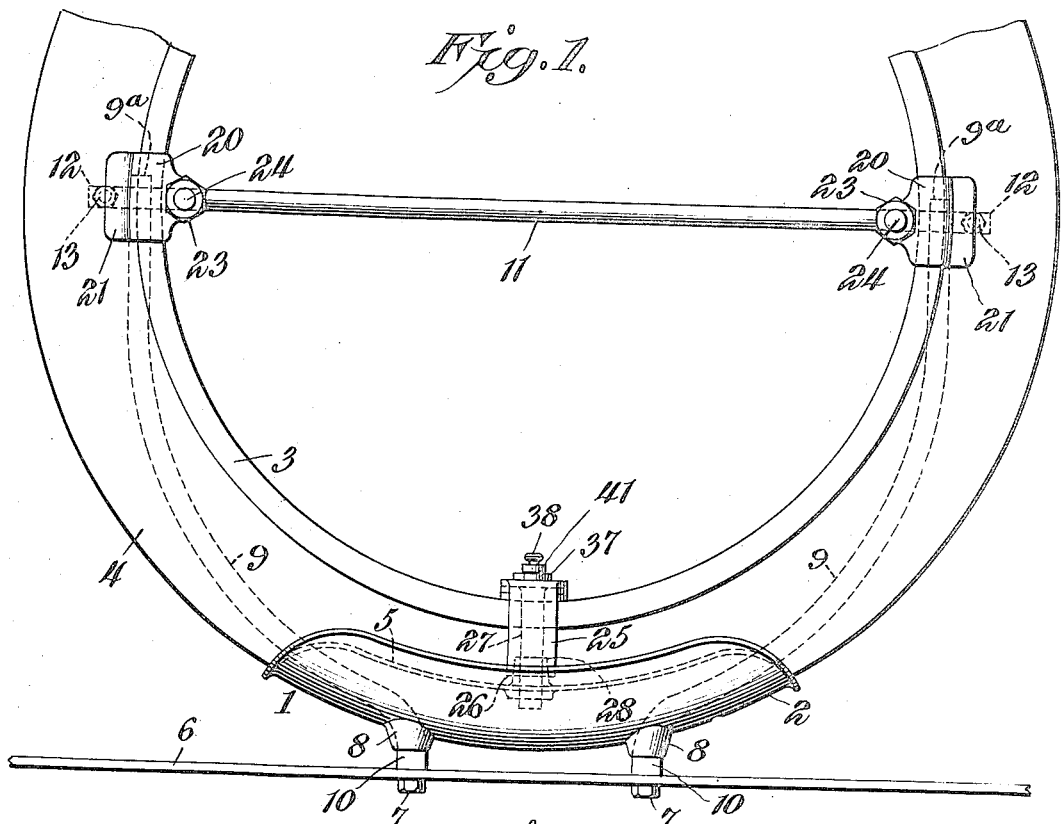
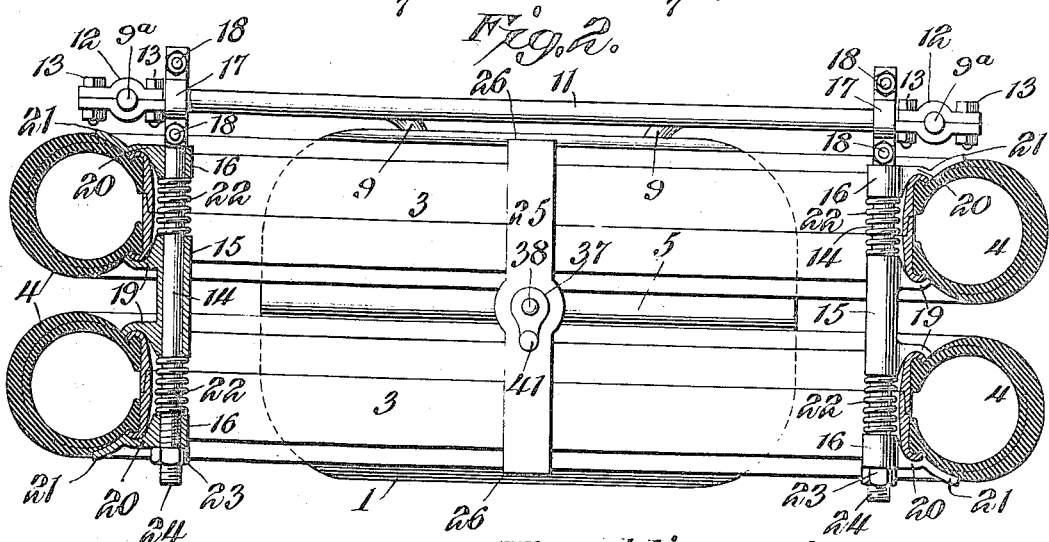
WITNESSES
Howard D. Orr
H. T. Riley
Franklin C. Miller, INVENTOR,
BY C. G. Siggers,
ATTORNEY F. C. MILLER.
TIRE HOLDER.
APPLICATION FILED JULY 25, 1913.
1,136,547.
Patented Apr. 20, 1915.
2 SHEETS—SHEET 2.
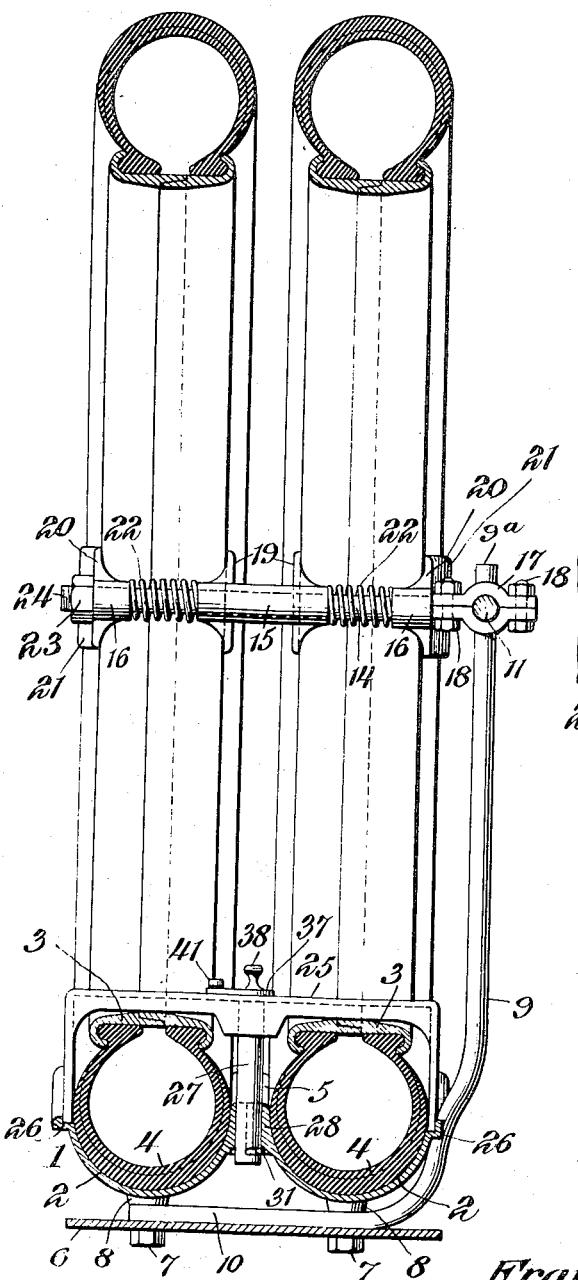
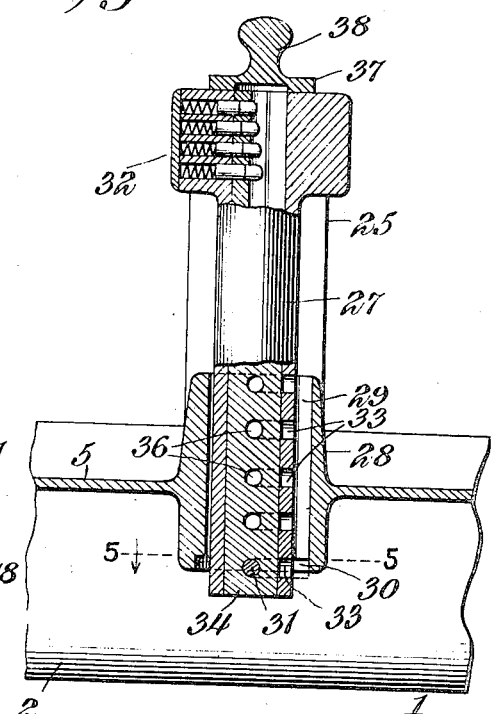
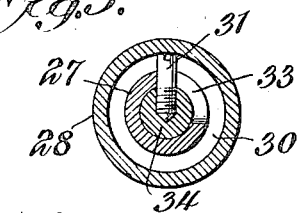
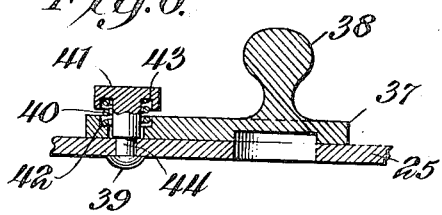
Franklin C. Miller, INVENTOR,
BY
ATTORNEY

UNITED STATES PATENT OFFICE.

FRANKLIN C. MILLER, OF EASTON, PENNSYLVANIA.

TIRE-HOLDER.

1,136,547.

Specification of Letters Patent.

Patented Apr. 20, 1915.

Application filed July 25, 1913. Serial No. 781,237.

*To all whom it may concern:*

Be it known that I, FRANKLIN C. MILLER, a citizen of the United States, residing at Easton, in the county of Northampton and State of Pennsylvania, have invented a new and useful Tire-Holder, of which the following is a specification.

The invention relates to improvements in rim and tire holders.

The object of the present invention is to improve the construction of tire holders, and to provide a simple, efficient and comparatively inexpensive tire holder adapted to be readily applied to an automobile and equipped with means for supporting side by side a plurality of demountable rims with various forms of tires and also various kinds of tires without rims, and capable of holding same perfectly rigid and absolutely safe without employing straps and buckles.

A further object of the invention is to provide a tire holder of this character, capable of adjustment to accommodate tires of different diameters and widths and provided also with means adapted to securely lock the rims and tires to the holder, and capable of ready adjustment to engage the same properly.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a front elevation of a rim and tire holder constructed in accordance with this invention. Fig. 2 is a plan view of the rim and tire holder, a pair of demountable rims and tires being shown in sections. Fig. 3 is a central vertical sectional view of the rim and tire holder. Fig. 4 is an enlarged detail sectional view of the lock. Fig. 5 is a horizontal view on line 5—5 of Fig. 4. Fig. 6 is a detail sectional view of the pivoted plate or cover for protecting the keyhole of the lock.

Like numerals of reference designate corresponding parts in all the figures of the drawings.

In the accompanying drawings in which is illustrated the preferred embodiment of the invention, 1 designates a bottom support of substantially the same construction as that shown, described and claimed in my copending application filed January 31, 1913, Serial No. 745,457, and constructed of pressed steel or other suitable material and curved transversely to provide spaced grooves 2 and to form seats for a pair of demountable rims 3 and tires 4 which are supported side by side in an upright position on the tire holder. The bottom support is curved longitudinally in a direction circumferentially of the tires to present upper concave surfaces to the same, and the tire-receiving grooves are spaced apart by an intermediate longitudinally disposed connecting web 5, approximately inverted U-shaped in cross section and spacing the grooves or seats 2 from each other. The support 1, which may be mounted on any portion of an automobile, is shown in the accompanying drawings as applied to the running board 6, and it is secured to the same at spaced points by bolts 7 or other suitable fastening devices arranged in pairs and piercing depressed portions 8 of the support to arrange them beyond and out of contact with the tires. The bolts 7 also secure supporting bars 9 to the support and to the running board, said supporting bars 9 being curved and diverging upwardly at the inner side of the inner tire. The supporting bars 9 are provided with lower integral attaching portions 10 extending beneath and disposed transversely of the support 1 and spacing the same from the running board, the said support being seated upon the said attaching portions 10.

The supporting bars 9 have vertically disposed upper terminal portions $9^a$ which adjustably receive the ends of a horizontally disposed longitudinal bar 11, provided at its ends with clamps 12, formed by splitting the terminal portions of the bar 11 to provide opposite coacting jaws.

The jaws of the clamp 12 are oppositely bowed at an intermediate point to conform to the configuration of and to embrace the upper terminal portions $9^a$ of the supporting bars, and they are maintained firmly in engagement with the same by bolts 13 or other suitable fastening devices arranged in pairs and piercing the jaws at the inner and outer sides of the supporting bars, as clearly illustrated in Fig. 2 of the drawing. The longitudinal connecting bar 11 is disposed diametrically with relation to the tires, and it is adapted to be raised and lowered to adjust it to suit tires of different heights or diameters in order that it may be arranged in proper position to support a pair of forwardly or outwardly extending rods or arms 14 centrally of the side portions of the tires. The rods or arms 14 which extend through the tires, as clearly shown in Fig. 2 of the drawing, carry intermediate and end clamping members 15 and 16 and are provided at their inner terminals with clamps 17, formed by splitting the inner ends of the rods or arms to provide opposite jaws which are curved or bowed upwardly and downwardly to engage and embrace the longitudinal connecting bar 11. The jaws of the clamp 17 are pierced by spaced bolts 18, located at the inner and outer sides of the bowed or bent portions of the jaws and adapted to maintain the same firmly in engagement with the connecting bar 11. The clamps 17, which adjustably secure the forwardly extending, horizontally disposed rods or arms 14 to the bar 11, are adapted to permit the said rods or arms to be moved inwardly and outwardly to arrange them in proper position to suit the size or diameter of the tires and rims.

The intermediate and end clamping members 15 and 16 consist of sleeves slidably arranged on the rods or arms 14 and provided with jaws 19 and 20, which engage the rims 2 of the tires at the side faces thereof. The jaws 19 and 20 are provided at their engaging faces with recesses conforming to the configuration of the rims and forming substantially hook-shaped portions for interlocking the clamping members with the said rims, and the jaws 20 of the end clamping members are provided with curved extensions 21 which are located beyond the rims and fit against and embrace the adjacent side portions of the tires. The clamping members engage the rims and tires, coiled springs 22 being disposed on the rods or arms 14 and interposed between the sleeves of the intermediate and end clamping members, which are retained on the said rods or arms by nuts 23 engaging the outer threaded portions 24 of the same. The nuts are adapted to be adjusted to place the springs under tension and bind or clamp the tires with the desired pressure, and the said nuts perform the double function of holding the clamping members in engagement with the rims and tires and comprising the springs to lock the nuts against rotary movement. The frictional engagement between the outer clamping members and the nuts through the action of the spring 22 is sufficient to effectually prevent the nuts from being accidentally unscrewed by the jars and vibrations incident to the travel of an automobile. The clamping members enable the tires to be firmly and safely held in place on the support without the use of straps and buckles or similar fastening means. When the nuts are detached, one or both of the rims and tires may be removed from the holder. The nuts also enable the springs to be placed under sufficient tension to firmly hold a single demountable rim and tire in the device.

The adjustable mounting of the longitudinal connecting bar on the supporting bars and the adjustable connection of the rods or arms 14 to the horizontal connecting bar enable the rods or arms 14 to be adjusted upwardly and downwardly and inwardly and outwardly on said bar, whereby they may be properly positioned to enable the clamping members carried by the said arms or rods 14 to engage the rims and tires at diametrically opposite points and at the centers of the sides, *i. e.*, midway between the top and bottom of the tires and rims, whereby the same are firmly and securely held on the supported tire.

The rims and tires are locked in the holder by means of a yoke 25 arching the support 1 and consisting of spaced sides and a connecting top portion, which extends through the rims and tires at the bottoms thereof and engages the rims at the upper sides of the bottom portions, as clearly shown in Fig. 3 of the drawing. The sides of the yoke fit in recess 26 in the outer side walls of the support 1 and they are retained in engagement with the outer side walls by means of a lock carried by the yoke and comprising a tubular stem 27, preferably formed integral with the yoke and containing the locking mechanism.

The depending tubular stem 27 extends through a vertical tube or sleeve 28, arranged centrally of and carried by the support 1 and extending through the connecting web thereof and projecting above and below the same, as clearly illustrated in Fig. 4 of the drawing. The vertical tube or sleeve 28 is provided with an interior vertical groove 29 extending from the upper edge of the sleeve 28 to an interior annular recess 30, located at the lower end of the tube or sleeve 28. The vertical groove 29 forms a passage for an engaging portion or bolt 31 of locking mechanism 32, mounted within and carried by the tubular stem. The tubular stem is provided with a vertical series of horizontal slots 33, and the locking mechanism includes a member 34, capable of rotary movement within the tubular stem and provided with a vertical series of threaded perforations 36 adapted to receive the engaging portion or bolt 31, which, as clearly illustrated in Fig. 5 of the drawings, is in the form of a screw for engaging the threaded perforations. The horizontal slots 33 are adapted to permit the engaging portion or bolt 31 to be oscillated or partially rotated to carry it to and from the vertical groove or passage to release and lock the yoke, which is firmly and securely held in its engaging position on the support 1 when the bolt or engaging portion 31 is carried from one end of the slot 33 at the vertical groove or passage 29 to the opposite end of the said slot 33. The vertical series of slots and perforations of the lock permit the yoke to be adjusted vertically to engage properly the rims and tires to be carried by the tire holder, and the yoke, which is made the maximum size, is adapted to have its sides trimmed or cut off to correspond to the proposed adjustment of the lock. The slots 33 and the perforations 36 are preferably arranged at intervals of one-half inch, and while the yoke may be made of any desired size, in practice it will be constructed to arch and properly engage a five inch tire. If it is desired to place a five inch tire in the holder, the bolt 31 is unscrewed from the lowermost hole and is placed in the hole next above which permits the tubular stem and the lock to drop down one-half inch, and by cutting one-half inch off each of the sides of the yoke the latter will be reduced to any size within the capacity of its adjustment to fit the rims and tires to be confined in the tire holder. Any suitable key-controlled locking mechanism may be employed for partially rotating member 34 which carries the bolt 31, and as the specific construction of such locking mechanism does not constitute a portion of the present invention, a detailed description thereof is deemed unnecessary.

The lock is provided at the top of the yoke with an entrance or keyhole which is normally covered by a pivoted plate 37, provided near one end with an integral knob 38 and mounted at its other end on a pivot 39 piercing the top portion of the yoke and having a coiled spring 40 disposed on it for engaging the plate or cover 37 to hold the latter in proper position over the keyhole to exclude dust, water, and other accumulation from the interior of the lock. The rivet, which is preferably headed at the lower end, is provided at its upper end with an enlarged head 41, and the coiled spring 40, which is located beneath the head 41, extends into opposite annular recesses 42 and 43 of the plate or cover and the head 41. The pivot 39 has a lower reduced portion 44 to pass through the yoke and a shoulder is formed at the upper end of the said reduced portion 44 to fit against the upper face of the top portion of the yoke.

No claim is made to a support provided with spaced concave tire receiving seats and having an intervening connecting web or portion, as this construction forms the subject matter of certain claims of the aforesaid application, and is also covered broadly by certain claims of my prior application, No. 750,701, filed February 25, 1913. Also no claim is made in the present application to the locking mechanism.

What is claimed is:—

1. A tire holder including spaced upwardly extending bars, a horizontal bar connecting the upper ends of the bars and adjustably secured to the same, whereby it is adapted to be arranged at different elevations, and arms carried by the horizontal bar in the adjustment thereof and arranged to extend through a rim or tire from the rear or inner side thereof and provided with means for engaging the same, said tire holder permitting the rim or tire to be removed from the front.

2. A tire holder including spaced upwardly extending bars, a bottom support secured to and connecting the lower ends of the bars and provided with a circumferentially curved tire receiving seat extending across the space between the said bars, and spaced outwardly extending arms located above the bottom support and connected at their inner ends with the spaced bars, said arms being arranged to extend through a rim or tire from the inner or rear side thereof, whereby the rim or tire is adapted to be removed from the tire holder at the front of the same.

3. A tire holder including a bottom support having a tire receiving seat, spaced upwardly extending bars connected with the bottom support at the end portions thereof, a horizontal bar connecting the upper ends of the spaced bars and adjustably secured to the same, whereby it is adapted to be arranged at different elevations, and arms carried by the horizontal bar and arranged to extend through a rim or tire from the rear or inner side thereof and provided with means for engaging the same.

4. A tire holder including a bottom support, a tire receiving seat, spaced bars extending upwardly from the bottom support at the ends thereof, a horizontal bar adjustably secured at its ends to the said spaced bars and adapted to be moved upwardly and downwardly to arrange it at different elevations, and horizontal arms extending outwardly or forwardly from the horizontal bar and arranged to project through a rim or tire from the inner or rear side thereof, and means for adjustably securing the arms to the horizontal bar for enabling the said arms to be arranged at different points on the said bar.

5. A tire holder including spaced upwardly extending bars provided with lower outwardly extending portions, a bottom support having a tire receiving seat and mounted upon the said outwardly extending portions, horizontal arms extending forwardly or outwardly and arranged to project through a tire or rim from the inner or rear side thereof, means carried by the arms for engaging a rim or tire, and means for connecting the inner ends of the arms with the spaced bars.

6. A tire holder including a bottom support having a tire receiving seat, spaced upwardly extending bars provided with outwardly extending portions arranged beneath and secured to the said support, a bar connecting the upwardly extending bars at the upper ends thereof, rods secured to the connecting bar and arranged to project through a tire or rim from the rear or inner side thereof, and means carried by the said rods for engaging a tire or rim.

7. A tire holder including a bottom support having a plurality of tire receiving seats, spaced bars connected with the bottom support and extending upwardly at the back thereof, a bar connecting the spaced bars at the upper ends of the same, rods connected with the said bar and extending forwardly or outwardly and arranged to project through a plurality of tires or rims, clamping members slidably mounted on the said rods and adapted to engage the tires or rims, and fastening means arranged at the front or outer ends of the rods for detachably retaining the clamping members on the said rods and for permitting the removal of the clamping members and the tires or rims from the front.

8. A tire holder including spaced upwardly extending bars, a bottom support secured to and connecting the lower ends of the bars and provided with a circumferentially curved tire receiving seat extending across the space between the said bars, spaced outwardly extending arms located above the bottom support and arranged to extend through a rim or tire from the inner or rear side thereof, whereby the tire or rim is adapted to be removed from the tire holder at the front thereof, and means for adjustably connecting the inner or rear ends of the arms with the spaced bars, said means permitting the arms to be raised and lowered and also to be moved toward and from each other.

9. A tire holder including spaced upwardly extending supporting bars, a bar or member connecting the supporting bars, clamps for adjustably securing said bars together, arms extending outwardly from the horizontal bar or member between the spaced supports and provided with clamping means for engaging the said bar or member, and means carried by the arms for engaging a rim or tire.

10. A tire holder including an arm, means for supporting the same, clamping members slidably mounted on the arm and arranged to engage a tire or rim at opposite sides thereof, a spring interposed between said clamping members, and means for placing the spring under tension and for causing the clamping members to engage the tire or rim with the desired pressure.

11. A tire holder including an arm, means for supporting the same, intermediate and end clamping members slidably mounted on the arm and provided with jaws for engaging a rim or tire, springs supported by the arm and interposed between the clamping members, and means for placing the springs under tension and for producing the desired pressure on the rims or tires.

12. A tire holder including an arm arranged to extend through a pair of rims and tires, intermediate and end clamping members, the intermediate clamping member being provided at its ends with jaws for engaging the rims at the inner sides thereof, and the end clamping members being provided with jaws for engaging the outer sides of the rims and having extensions to engage the tires, spring interposed between the clamping members, and means for placing the springs under tension and for producing the desired pressure on the rims or tires.

13. A tire holder including a support having tire-receiving seats, spaced supporting bars extending upwardly at the back of the support and provided with attaching portions arranged beneath the said support, a bar connecting said supports, and arms projecting from the bar at points between the supporting bars and arranged to extend through the rims or tire and provided with means for engaging the same.

In testimony, that I claim the foregoing as my own, I have hereto affixed my signature in the presence of two witnesses.

FRANKLIN C. MILLER.

Witnesses:
S. S. HORN,
RUSSELL D. WELCH.